United States Patent
Mori (10) Patent No.: US 9,948,815 B2
(45) Date of Patent: Apr. 17, 2018

(54) IMAGE READING APPARATUS CONFIGURED TO MAKE ADJUSTMENTS WHEN SET TO READ TWO SIDES OF A DOCUMENT

(71) Applicant: CANON KABUSHIKI KAISHA, Tokyo (JP)

(72) Inventor: Junichi Mori, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/226,345

(22) Filed: Aug. 2, 2016

(65) Prior Publication Data

US 2017/0041492 A1 Feb. 9, 2017

(30) Foreign Application Priority Data

Aug. 7, 2015 (JP) ................................. 2015-156719

(51) Int. Cl.
*H04N 1/193* (2006.01)
*H04N 1/203* (2006.01)
*H04N 1/40* (2006.01)
*H04N 1/00* (2006.01)

(52) U.S. Cl.
CPC ........... *H04N 1/193* (2013.01); *H04N 1/0057* (2013.01); *H04N 1/00087* (2013.01); *H04N 1/00411* (2013.01); *H04N 1/203* (2013.01); *H04N 1/40056* (2013.01); *H04N 2201/0081* (2013.01)

(58) Field of Classification Search
None
See application file for complete search history.

(56) References Cited

U.S. PATENT DOCUMENTS

| 6,289,134 B1* | 9/2001 | Kondo | H04N 1/40006 358/461 |
| 7,525,692 B2* | 4/2009 | Nakaya | H04N 1/4076 358/461 |
| 8,976,430 B2* | 3/2015 | Morita | H04N 1/407 358/1.9 |
| 2004/0001187 A1* | 1/2004 | Fukusaka | H04N 1/2032 355/26 |
| 2013/0335788 A1* | 12/2013 | Utsunomiya | H04N 1/00801 358/474 |

FOREIGN PATENT DOCUMENTS

JP  2008-22527 A  1/2008

* cited by examiner

*Primary Examiner* — Thomas D Lee
(74) *Attorney, Agent, or Firm* — Canon USA, Inc. I.P. Division (57) ABSTRACT

There is provided a control method for an image reading apparatus including a document conveyance unit configured to convey a document, a first reading unit configured to read a first surface of the document conveyed by the document conveyance unit, and a second reading unit configured to read a second surface of the document conveyed by the document conveyance unit, includes setting a two-sided reading mode for reading the first surface and the second surface of the document, and starting initial adjustment operation of the second reading unit in response to setting of the two-sided reading mode.

13 Claims, 8 Drawing Sheets

IMAGE READING APPARATUS CONFIGURED TO MAKE ADJUSTMENTS WHEN SET TO READ TWO SIDES OF A DOCUMENT

BACKGROUND

Field of the Disclosure

Aspects of the present invention generally relate to an image reading apparatus capable of reading both sides of a document, a control method for the image reading apparatus, and a storage medium.

Description of the Related Art

In recent years, there has been an increasing need for efficiently computerizing office documents, and a two-sided simultaneous reading system has become mainstream. In the two-sided simultaneous reading system, two reading units, one for a front side and the other for a back side, respectively, are provided in a document reading apparatus (automatic document feeder (ADF)). In such a document reading apparatus, these two reading units are provided over a document conveyance path to read the respective sides of a document, and both sides of the document are read without reversing a conveyance direction of the document. As a result, the time required for reading the two-sided document is reduced. Further, in the ADF of the two-sided simultaneous reading system, the reading unit for the back side is installed on the document conveyance path side of the ADF, and this installation is mainstream. This reading unit for the back side needs to be in an operational state at least when two-sided reading is performed. This reading unit for the back side is not necessarily energized when one-sided reading is performed. Therefore, some of the apparatuses are controlled to turn on and activate the reading unit for the back side upon being instructed by a user to execute two-sided reading, in order to reduce power consumption or increase the life of the unit.

In addition, in general, a reading sensor has reading characteristics that change due to an elapsed time or an environmental change such as a temperature rise after start of driving. For this reason, adjustment operation is performed before reading. The adjustment operation mainly includes offset adjustment, reading gain adjustment, and light amount adjustment, besides shading correction. For example, the adjustment operation is performed for each of the front side reading unit and the back side reading unit, after an instruction for starting a two-sided reading job is provided by a press of a start key by the user. In this process, the time required from the job start instruction to the reading start may be reduced, by starting the adjustment operation first for the reading unit for a side that is expected to consume a longer time for adjustment. A method for achieving such a reduction in time has been discussed in, for example, Japanese Patent Application Laid-Open No. 2008-22527.

However, the adjustment operation begins upon receipt of the instruction for starting the two-sided reading job from the user and thus, if this adjustment operation takes a long time, a waiting time before the start of reading processing increases. As a result, a waiting time before completion of reading also increases, thereby reducing convenience.

SUMMARY

According to an aspect of the present invention, an image reading apparatus includes a document conveyance unit configured to convey a document, a first reading unit configured to read a first surface of the document conveyed by the document conveyance unit, a second reading unit configured to read a second surface of the document conveyed by the document conveyance unit, and a setting unit configured to set a two-sided reading mode for reading the first surface and the second surface of the document, wherein initial adjustment operation of the second reading unit starts in response to setting of the two-sided reading mode by the setting unit.

Further features of the present invention will become apparent from the following description of exemplary embodiments with reference to the attached drawings.

BRIEF DESCRIPTION OF THE DRAWINGS

FIG. 6 (consisting of FIGS. 6A and 6B) is a flowchart illustrating control processing to be executed in an image reading unit according to an exemplary embodiment.

DESCRIPTION OF THE EMBODIMENTS

An exemplary embodiment of the present invention will be described below with reference to the drawings.

<Image Reading Apparatus>

Figure 1:
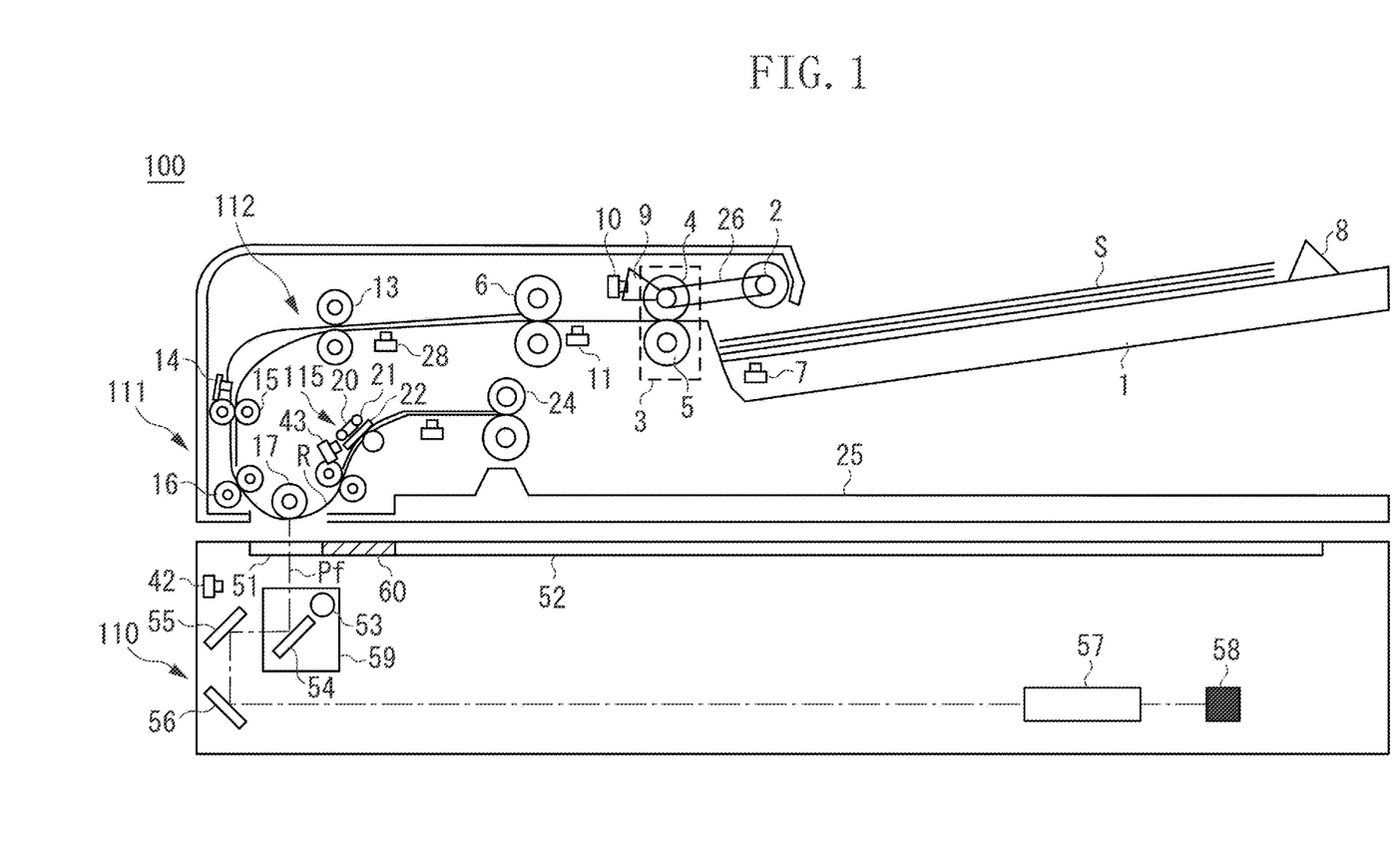
FIG. 1 is a cross-sectional diagram illustrating an example of a configuration of a main part of an image reading apparatus according to an exemplary embodiment.

FIG. 1 is a cross-sectional diagram illustrating a configuration of a main part of an image reading apparatus according to the present exemplary embodiment. This image reading apparatus may be configured as a single apparatus, but may be connected to an image forming apparatus or configured as a part of an image forming apparatus. Therefore, this image reading apparatus may be a part of a multifunction peripheral having various functions such as printing, copying, and fax transmission/reception. In addition, this image reading apparatus may be configured as a part of a single function apparatus such as a scanner, a copier, and a fax machine.

Figure 3:
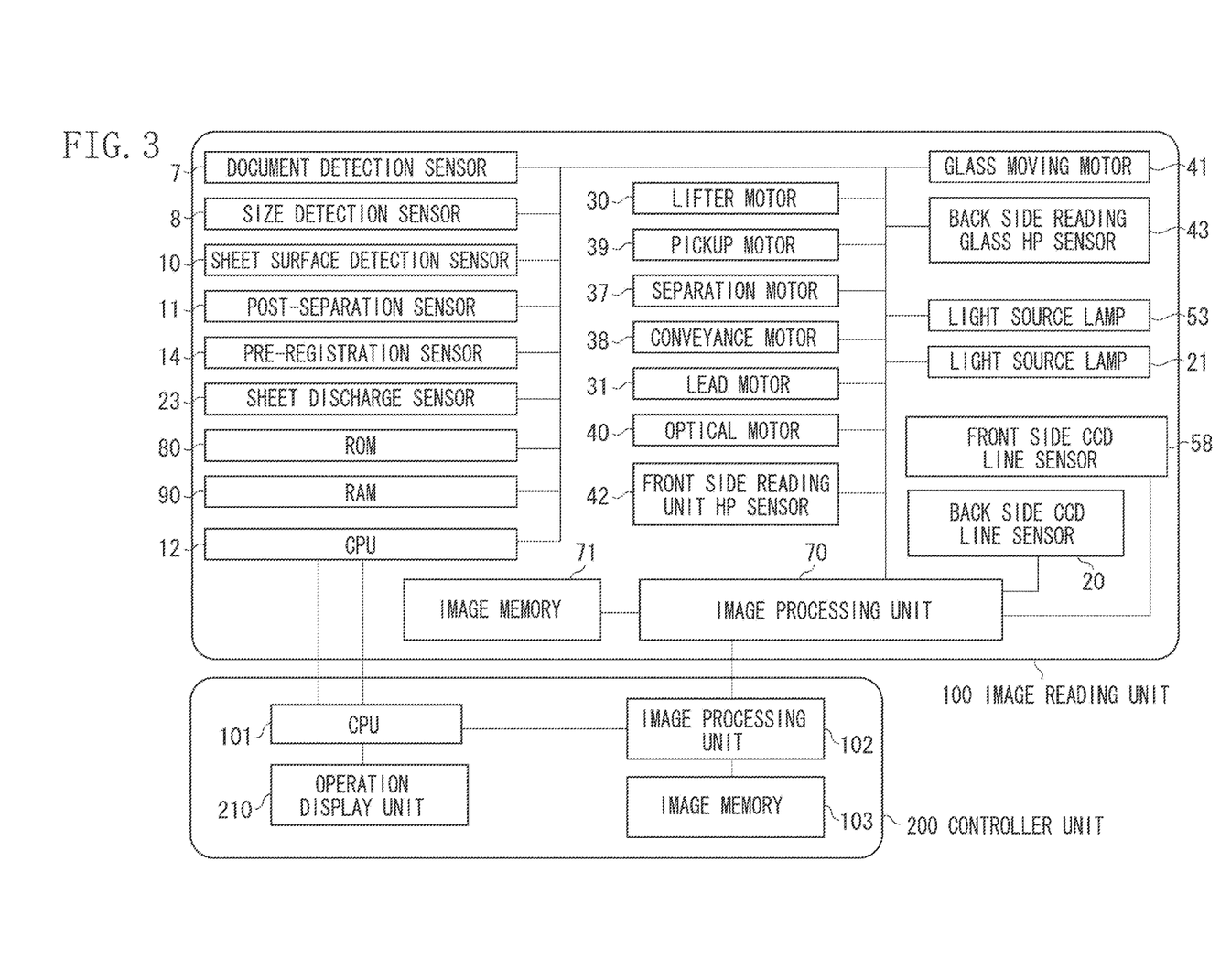
FIG. 3 is a block diagram illustrating a configuration of the image reading apparatus.

As illustrated in FIG. 1, the image reading apparatus according to the present exemplary embodiment includes an image reading unit 100 and a controller unit 200 (FIG. 3). The image reading unit 100 includes a lower half unit 110 and an upper half unit 111.

The lower half unit 110 mainly includes components such as a pressing plate glass 52, a flow reading glass 51, a front side reading unit 59, and a front side charge coupled device (CCD) line sensor 58. A reference white board 60 is provided between the pressing plate glass 52 and the flow reading glass 51.

The upper half unit 111 mainly includes a document tray 1, an automatic document conveyance unit (hereinafter referred to as "automatic document feeder (ADF) unit") 112, and a back side reading unit 115. The ADF unit 112 is provided to convey a document set on the document tray 1 to a document discharge tray 25 along a conveyance path R. The back side reading unit 115 is disposed over the conveyance path R.

The image reading unit 100 has a fixed reading mode and a flow reading mode, each provided as a reading mode. In the fixed reading mode, when a user presses a start key 304 (FIG. 4) to be described below, without placing (setting) any document on the document tray 1 of the ADF unit 112, a document set on the pressing plate glass 52 is read using the front side CCD line sensor 58. In this case, the underside of the document facing the pressing plate glass 52 is to be read. Therefore, the user places the document, with a side intended to be read facing downward, on the pressing plate glass 52.

In the fixed reading mode, the front side reading unit 59 is moved to slide along the pressing plate glass 52 by an optical motor 40 (FIG. 3). Subsequently, the front side reading unit 59 (a light source lamp 53 and a mirror 54) moves, and the front side CCD line sensor 58 reads the document by receiving light that passes through a lens 57 after being reflected by mirrors 55 and 56 (pressing plate reading). In this case, neither of the ADF unit 112 nor the back side reading unit 115 are used.

The flow reading mode is a mode for reading a document while fixing the front side reading unit 59 and conveying the document with the ADF unit 112. A one-sided reading mode and a two-sided reading mode are each provided as the flow reading mode. In the one-sided reading mode, the front side CCD line sensor 58 reads the front side of the document being conveyed, via the flow reading glass 51, at a front side reading position Pf (one-sided reading). In the two-sided reading mode, a back side CCD line sensor 20 of the back side reading unit 115 reads the back side of the document being conveyed, in parallel with the reading by the front side CCD line sensor 58 (two-sided reading).

In the ADF unit 112, the document tray 1 is capable of ascending and descending, and a document bundle made of at least one sheet document is to be placed on the document tray 1. The document tray 1 includes a document detection sensor 7 and a size detection sensor 8. A document on the top of the document bundle is sent into the upper half unit 111 of the image reading unit 100 by a pickup roller 2.

Before conveyance of the document begins, the pickup roller 2 descends, and a lifter motor 30 (FIG. 3) is driven to cause the document tray 1 to ascend. When the document on the top of the document bundle arrives at a conveyance position, a sheet surface detection flag 9, which rotates by interlocking with the pickup roller 2 being in contact with the uppermost surface of the document bundle, interrupts a sheet surface detection sensor 10. The interrupted sheet surface detection sensor 10 then outputs an ON signal indicating that a sheet surface is detected. Based on this ON signal, the ascending of the document tray 1 is stopped. Conveyance operation then begins. The documents conveyed by the pickup roller 2 are separated one by one, by the action of a separation roller pair 3 configured of a feed roller 4 and a retard roller 5. This separation is implemented by a known retard separation technique.

The separated document is conveyed by a drawing roller pair 6 and a conveyance roller pair 13, via a post-separation sensor 11 and a pre-registration sensor 14. The document then abuts against a registration roller pair 15 and skew of the conveyed document is eliminated.

After the skew is eliminated, the document is conveyed to a platen upstream roller pair 16 and then to a platen roller 17, by the registration roller pair 15. At that time, the platen roller 17 is in contact with the flow reading glass 51, and the front side of the document passing the platen roller 17 is pressed against the flow reading glass 51. Further, the front side of the document is irradiated with the light source lamp 53 of the front side reading unit 59. Subsequently, light reflected from the front side of the document is received by the front side CCD line sensor 58, via the mirrors 54, 55, and 56, and the lens 57, and an image signal indicating an image of the front side of the document is thereby generated.

The document conveyed by the platen roller 17 passes through a platen downstream roller pair 18, and is then conveyed to a back side reading roller 19. The back side reading roller 19 is in contact with a moving glass 22 configured to be movable. In the two-sided reading mode, the back side of the document passing between the moving glass 22 and the back side reading roller 19 is irradiated with a light source lamp 21. Subsequently, light reflected from the back side of the document is received by the back side CCD line sensor 20, and an image signal indicating an image of the back side is thereby generated.

The document conveyed by the back side reading roller 19 is discharged to the document discharge tray 25 by an sheet discharge roller pair 24 via a sheet discharge sensor 23. The lower half unit 110 further includes a front side reading unit home position (HP) sensor 42 for detecting the position of the front side reading unit 59. The upper half unit 111 further includes a back side reading glass HP sensor 43 for detecting the position of the moving glass 22.

<Back Side Reading Unit>

Figure 2A:
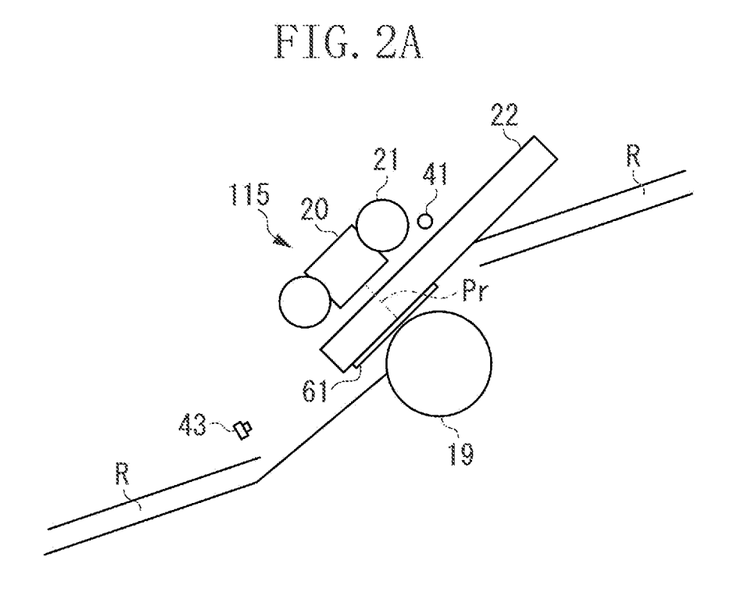
FIGS. 2A and 2B are enlarged views of a back side reading unit and surrounding area.
Figure 2B:
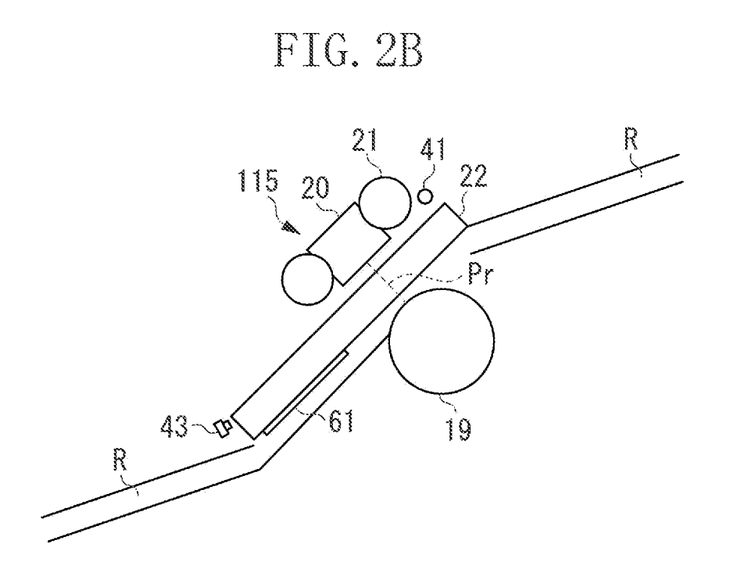

FIGS. 2A and 2B are enlarged views of the back side reading unit 115 and surrounding area.

A reference white board 61 is affixed to the moving glass 22. The moving glass 22 is moved by a glass moving motor 41, and a mechanism for moving the moving glass 22 by using the glass moving motor 41. The back side CCD line sensor 20 in the back side reading unit 115 reads, at a back side reading position Pr, the back side of the document passing the back side reading position Pr on the conveyance path R.

In particular, the position of the moving glass 22 illustrated in FIG. 2A is a position at which adjustment operation of the back side CCD line sensor 20 using the reference white board 61 is executed before the back side of the document is read. In this state, the reference white board 61 is disposed at a position where the CCD line sensor 20 can read a reference plane of the reference white board 61. The position of the reference white board 61 and the moving glass 22 in this state is referred to as "first predetermined position". The position of the moving glass 22 illustrated in FIG. 2B is a predetermined position at which the back side CCD line sensor 20 reads the back side of the document in the two-sided reading mode, and this position is referred to as "second predetermined position". In this state, the reference white board 61 is at a position shifted from a reading position of the CCD line sensor 20.

As preparation for driving the moving glass 22, positioning of the moving glass 22 is performed using the back side reading glass HP sensor 43. When the moving glass 22 is at the first predetermined position, the reference white board 61 is located at the back side reading position Pr of the back side CCD line sensor 20. When various adjustments are performed in an initialization sequence to be described below, the moving glass 22 is located at the first predetermined position, and the back side CCD line sensor 20 reads the reference white board 61.

When the moving glass 22 is at the second predetermined position, the moving glass 22 is a part of the conveyance path R to enable conveyance of the document. When the moving glass 22 is at the second predetermined position, the back side of the document can be read via the moving glass 22. In the two-sided reading mode, the back side CCD line sensor 20 reads an image of the back side of the document conveyed through the conveyance path R, at the back side reading position Pr. The moving glass 22 forms the part of the conveyance path R. For this reason, when the CCD line sensor 20 is not used, e.g., in the one-sided reading mode, and when a document is simply conveyed, the moving glass 22 needs to be located at the second predetermined position.

In the example described above, the reference white board 61 is affixed to the moving glass 22 to be supported. However, for a moving substrate supporting the reference white board 61, a moving substrate using a transparent material such as a transparent acrylic board may be used in place of the moving glass 22.

<Block Diagram of Image Reading Apparatus>

FIG. 3 is a block diagram illustrating a configuration of the image reading apparatus.

The image reading unit 100 includes various sensors and various motors, in addition to a central processing unit (CPU) 12, a read only memory (ROM) 80, a random access memory (RAM) 90, the light source lamp 21, the light source lamp 53, an image processing unit 70, and an image memory 71. The various motors include, in addition to the motors described above, a lead motor 31, a separation motor 37, a conveyance motor 38, and a pickup motor 39. The separation motor 37 is a drive source for the separation operation by the separation roller pair 3. The conveyance motor 38 is a drive source for the conveyance of the document along the conveyance path R in the ADF unit 112.

The controller unit 200 includes a CPU 101, an image processing unit 102, an image memory 103, and an operation display unit 210.

The CPU 12 serving as a control unit controls the entire image reading unit 100. The CPU 101 controls the entire controller unit 200. The image reading unit 100 and the controller unit 200 are electrically connected. The CPU 12 and the CPU 101 send and receive commands to and from each other via serial communication.

When the image reading unit 100 reads the front side of the document, the front side CCD line sensor 58 outputs an analog electrical signal according to an image density of the read document. When the image reading unit 100 reads the back side of the document, the back side CCD line sensor 20 outputs an analog electrical signal according to an image density of the read document. These analog electrical signals are each converted into a digital image signal by an analog-to-digital (A/D) conversion circuit (not illustrated), and the digital image signal is input to the image processing unit 70. Image data based on the input image signal is temporarily buffered to the image memory 71.

Based on an instruction from the controller unit 200, the buffered image data is transferred to the image processing unit 102 of the controller unit 200 via the image processing unit 70, and then accumulated in the image memory 103. The accumulated image data is then appropriately used for various functions such as a copy function and a fax transmission function. In addition, power on and off of the image reading unit 100 can be controlled based on instructions from the controller unit 200.

<Operation Display Unit>

Figure 4:
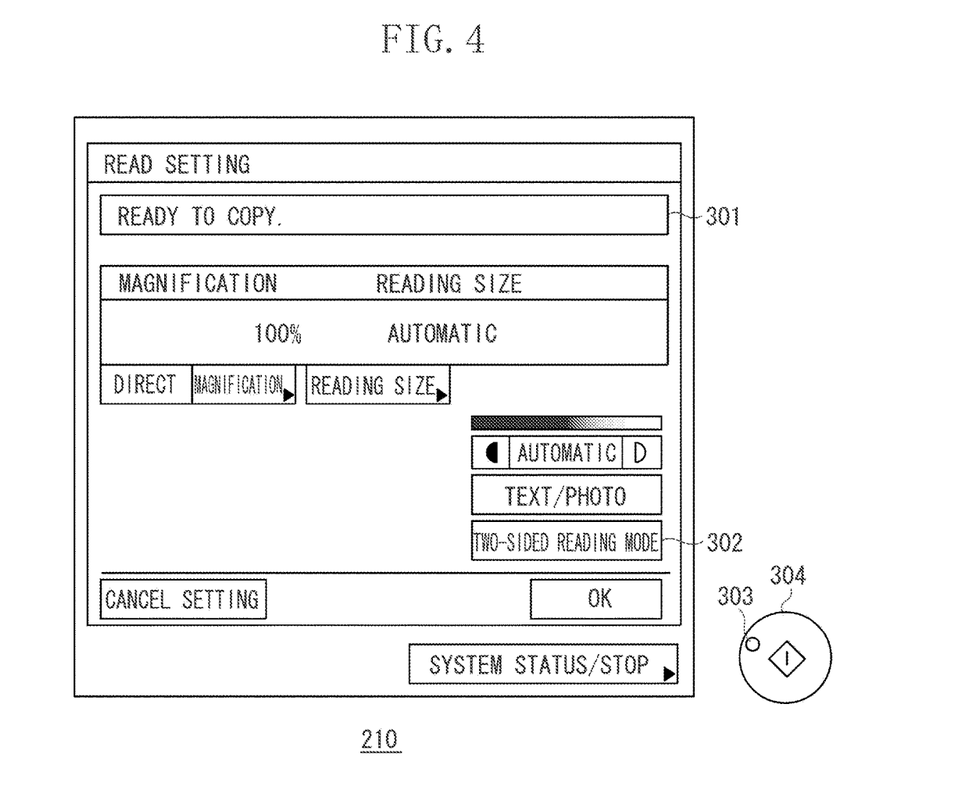
FIG. 4 is a diagram illustrating a display example in an operation display unit of a controller unit.

FIG. 4 is a diagram illustrating a display example of a display screen on the operation display unit 210 of the controller unit 200. The operation display unit 210 includes a liquid crystal display unit having a touch panel function, and has a screen on which software keys such as a two-sided reading mode button 302 can be created. On the screen of the operation display unit 210, the user can set a reading mode setting such as the two-sided reading mode for a document. When the two-sided reading mode button 302 is pressed to be ON, the two-sided reading mode is set. Further, for example, the two-sided reading mode button 302 may be pressed again to set the one-sided reading mode by cancelling the two-sided reading mode. The reading mode setting for either one of the one-sided reading mode and the two-sided reading mode can be thus selected.

The start key 304 and a light emitting diode (LED) 303 are disposed near the screen of the operation display unit 210. In a message area 301 of the operation display unit 210, a message according to the status of the image reading unit 100 is displayed. Further, the LED 303 is switched between turning on and off according to the status of the image reading unit 100. The LED 303 is turned on and off to notify that the start key 304 is enabled and disabled, respectively.

<Control of Controller Unit 200>

Figure 5:
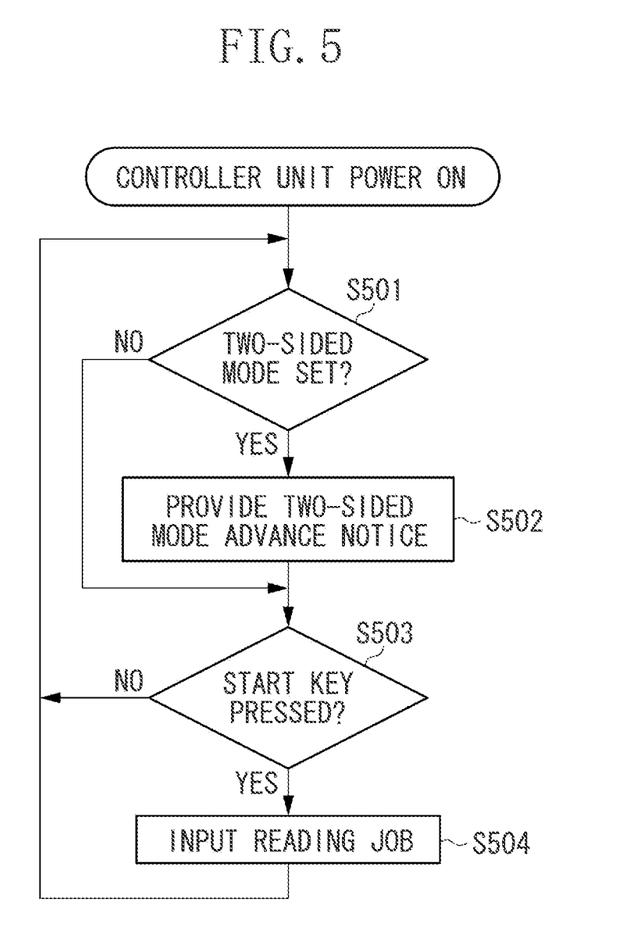
FIG. 5 is a flowchart illustrating control processing according to an exemplary embodiment.

FIG. 5 is a flowchart illustrating control processing to be executed in the controller unit 200.

This processing begins when the user turns on a power supply switch (not illustrated) of the image reading apparatus. The controller unit 200 executes a process in each step illustrated in FIG. 5. To be more specific, for example, the CPU 101 of the controller unit 200 loads a control program stored in a ROM (not illustrated) into a RAM (not illustrated), and executes the loaded control program, thereby implementing the process in each step.

First, in step S501, the CPU 101 of the controller unit 200 determines whether a two-sided mode is set by a press of the two-sided reading mode button 302, upon turning on of the power. When the CPU 101 determines that the two-sided mode is set (YES in step S501), the processing proceeds to step S502. In step S502, the CPU 101 provides a two-sided mode advance notice to the CPU 12, as an advance notice of the document reading mode, and then the processing proceeds to step S503. On the other hand, when the CPU 101 determines that the two-sided mode is not set (NO in step S501), the processing directly proceeds to step S503.

Next, in step S503, the CPU 101 determines whether the start key 304 is pressed. When the CPU 101 determines that the start key 304 is pressed (YES in step S503), the processing proceeds to step S504. In step S504, the CPU 101 puts a reading job into the CPU 12. The processing then returns to step S501 and the processing is repeated. On the other hand, when the start key 304 is not pressed during a predetermined time (NO in step S503), the processing returns to step S501. In step S501, the CPU 101 waits.

<Control of Image Reading Unit 100>

Figures 6, 6A:
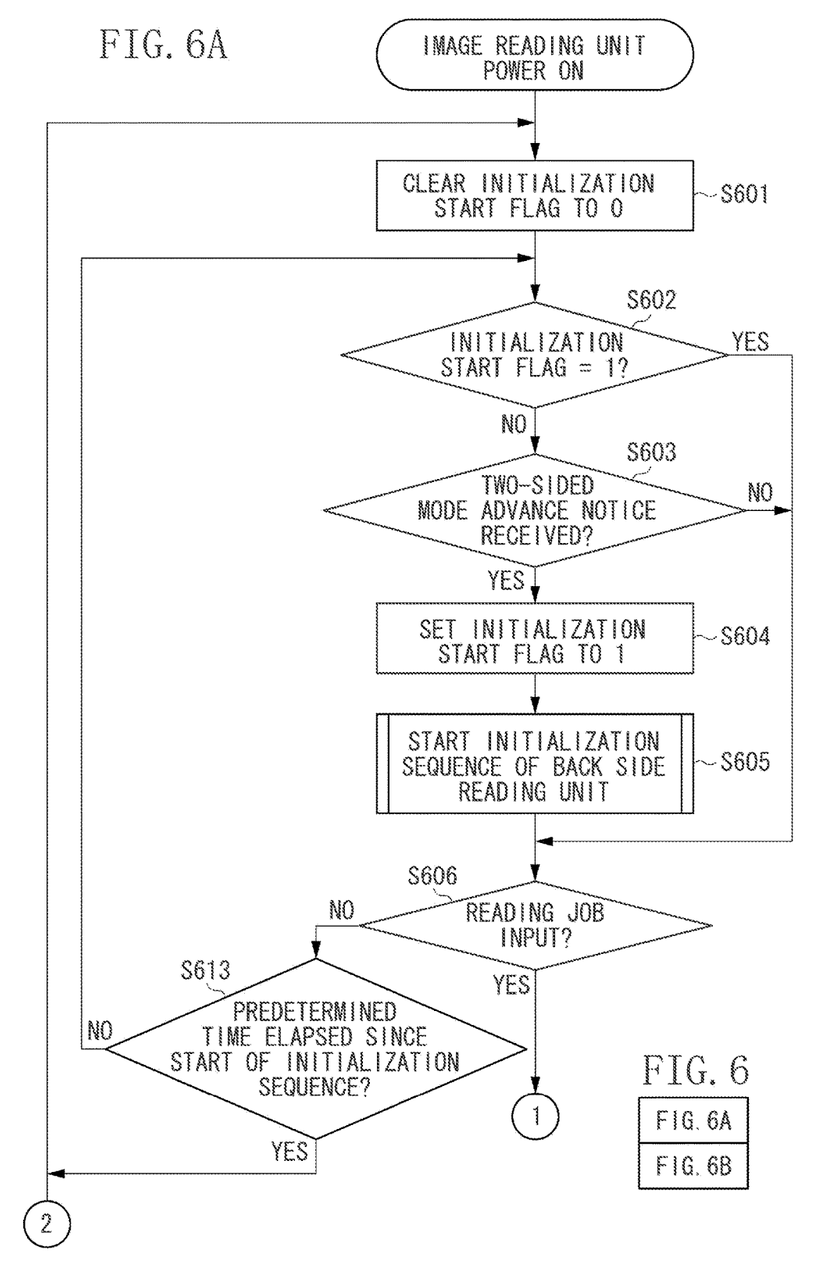
Figure 6B:
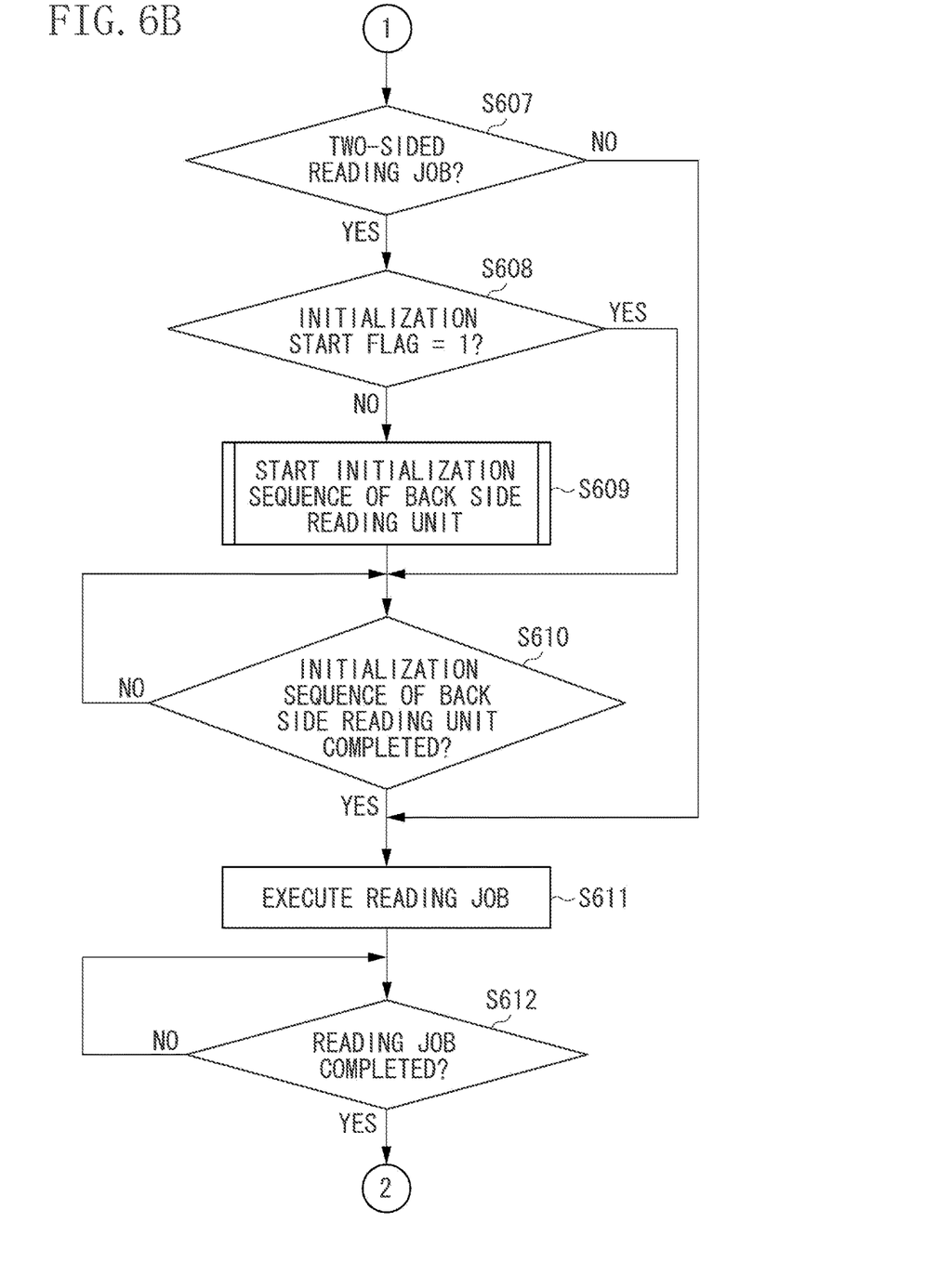

FIG. 6 (consisting of FIGS. 6A and 6B) is a flowchart illustrating control processing to be executed in the image reading unit 100.

This processing begins, when the user turns on the power supply switch (not illustrated) of the image reading apparatus, and the controller unit 200 thereby energizes the image reading unit 100. The image reading unit 100 executes a process in each step illustrated in FIG. 6. To be more specific, for example, the CPU 12 of the image reading unit 100 loads a control program stored in the ROM 80 into the RAM 90, and executes the loaded control program, thereby implementing the process in each step.

First, in step S601, the CPU 12 clears an initialization start flag on the RAM 90 to 0, after turning on of the power. This initialization start flag indicates whether the initialization sequence of the back side reading unit 115 has started.

Next, in step S602, the CPU 12 determines whether the initialization start flag is 1. When the CPU 12 determines that the initialization start flag is not 1 (NO in step S602), the processing proceeds to step S603. In step S603, the CPU 12 determines whether the two-sided mode advance notice from the CPU 101 of the controller unit 200 is received. This two-sided mode advance notice is provided in step S502 illustrated in FIG. 5. When the CPU determines that the two-sided mode advance notice is received (YES in step S603), the processing proceeds to step S604. In step S604, the CPU 12 sets the initialization start flag to 1. The processing then proceeds to step S605. In step S605, the CPU 12 starts the initialization sequence, which is to be described below with reference to FIG. 7, of the back side reading unit 115, and executes processing of the initialization sequence illustrated in FIG. 7 in parallel with the control in FIG. 6.

Next, in step S606, the CPU 12 determines whether a reading job is submitted from the controller unit 200. When the CPU 12 determines that the initialization start flag is 1 (YES in step S602), and when the CPU 12 determines that the two-sided mode advance notice is not received (NO in step S603), the processing also proceeds to step S606 to determine whether a reading job is input.

This reading job is the reading job input in step S504 illustrated in FIG. 5. When the CPU 12 determines that the reading job is input (YES in step S606), the processing proceeds to step S607. In step S607, the CPU 12 determines whether the input job is a two-sided reading job. When the CPU 12 determines that the submitted job is a two-sided reading job (YES in step S607), the processing proceeds to step S608. In step S608, the CPU 12 determines whether the initialization start flag is 1. When the CPU 12 determines that the initialization start flag is not 1 (NO in step S608), the processing proceeds to step S609. In step S609, the CPU 12 starts the initialization sequence of the back side reading unit 115 (hereinafter, also referred to as the back-side-reading-unit initialization sequence). This process corresponds to the process in step S605.

Next, in step S610, the CPU 12 determines whether the back-side-reading-unit initialization sequence is completed. When the CPU 12 determines that the initialization start flag is 1 (YES in step S608), the processing directly proceeds to step S610. In step S610, the CPU 12 determines whether the back-side-reading-unit initialization sequence is completed.

When the CPU 12 determines that the back-side-reading-unit initialization sequence is not completed (NO in step S610), the CPU 12 waits until the back-side-reading-unit initialization sequence is completed. On the other hand, when the back-side-reading-unit initialization sequence is completed (YES in step S610), the processing proceeds to step S611. In step S611, the input reading job is executed.

On the other hand, when the CPU 12 determines that the job input in step S607 is not a two-sided reading job (NO in step S607), the processing proceeds to step S611. In step S611, the reading job is immediately executed. By executing the reading job, the CPU 12 causes the front side CCD line sensor 58 and the back side CCD line sensor 20 to read the document, by conveying the documents set on the document tray 1 one by one. The CPU 12 then repeats this operation until no documents are left on the document tray 1. In step S612, the CPU 12 determines whether the document reading operation for the reading job is completed. When the document reading operation for the reading job is completed (YES in step S612), the processing returns to step S601.

When the CPU 12 determines that a reading job is not input (NO in step S606), the processing proceeds to step S613. In step S613, the CPU 12 determines whether a predetermined time (one minute in the present exemplary embodiment) has elapsed since the start of the initialization sequence of the back side reading unit 115. This is to determine whether a predetermined time has elapsed in a state in which no reading job is input from the controller unit 200 after the start of the initialization sequence in response to the two-sided mode advance notice in step S605. When the predetermined time has elapsed in the state in which no reading job is input and no document reading start instruction is issued (YES in step S613), the processing returns to step S601 to reset the result of the initial adjustment operation. When the predetermined time has not elapsed (NO in step S613), the processing returns to step S602.

<Initialization Sequence of Back Side Reading Unit>

Figure 7:
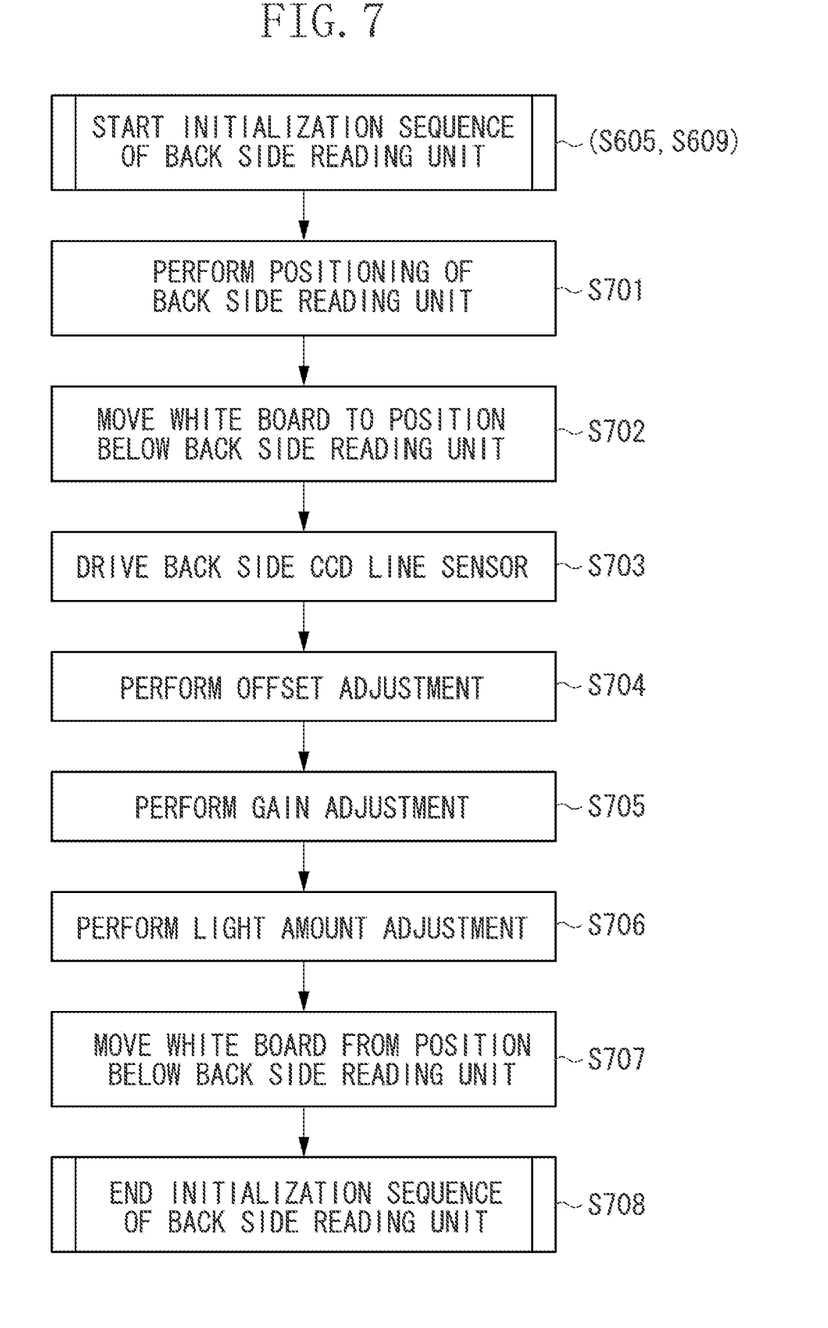
FIG. 7 is a flowchart illustrating an initialization sequence of the back side reading unit according to an exemplary embodiment.

FIG. 7 is a flowchart illustrating the initialization sequence of the back side reading unit 115.

In this initialization sequence, image reading conditions at the time of reading the back side are adjusted. This is the initial adjustment operation for making preparation for the back side reading, and mainly includes the offset adjustment, the adjustment of reading gain, and the light amount adjustment, besides the shading correction. For this initial adjustment operation, only one type may be performed or a plurality of types may be combined and performed as necessary.

Here, a case in which a CCD line sensor is used as an example of a back side reading sensor, will be described below.

The CPU 12 starts this initialization sequence in step S605 or S609 in FIG. 6. The CPU 12 performs control for executing processing for this initialization sequence, in parallel with the control illustrated in FIG. 6.

First, in step S701, the CPU 12 drives the glass moving motor 41 (FIG. 3) to thereby slide the moving glass 22, and performs positioning at the timing of a change in the back side reading glass HP sensor 43 (FIG. 1). In step S702, the CPU 12 keeps the driving to move the moving glass for a predetermined distance after that timing, and stops the moving glass 22 so that the reference white board 61 faces the back side CCD line sensor 20 (to be located at the back side reading position Pr) (FIG. 2A).

Next, in step S703, the CPU 12 drives the back side CCD line sensor 20. Subsequently, in step S704, the CPU 12 performs the offset adjustment of reading a darkest value of density output by the back side CCD line sensor 20 in a state where the light source lamp 21 is turned off.

Next, in step S705, the CPU 12 turns on the light source lamp 21, and searches for, while gradually increasing the amount of light emission of the light source lamp 21, an amount of light emission at which a brightest value of the density output by the back side CCD line sensor 20 reaches a predetermined value. The CPU 12 then adjusts the reading gain of the back side CCD line sensor 20. Further, in step S706, the CPU 12 performs the light amount adjustment, by searching for a gain value at which a brightest value reaches a predetermined value, by using a value at the time of the light amount adjustment.

In step S707, the CPU 12 drives the glass moving motor 41 (FIG. 3) to thereby slide the moving glass 22, and stops the moving glass 22 at the position where the back side CCD line sensor 20 reads the back side of the document (FIG. 2B).

In step S708, the back-side-reading-unit initialization sequence ends.

In an image reading apparatus, which has two reading units, one for a front side and the other for a back side, and employs a two-sided simultaneous reading system, the initial adjustment of the reading unit for the back side, in particular, requires a longer time. This is because this adjustment needs to move a moving substrate on which a reference white board is disposed. However, in the present exemplary embodiment, the initialization of the back side reading unit 115 begins when the user performs two-sided setting operation. Therefore, afterward, the waiting time from input of a two-sided reading job in response to a press of the start key 304 by the user to start of actual reading can be reduced.

In addition, in a case where the start key 304 is not pressed during a predetermined time or more after the two-sided setting operation is performed by the user, values such as adjustment values of image reading conditions for back side reading, which are previously obtained in the initialization sequence, are not used. In other words, the initialization is performed again when the reading is executed next. Therefore, values such as adjustment values, which become unsuitable for a situation where reading is actually executed because of an excessive lapse of time, are prevented from being used when the reading is actually executed.

The two-sided reading mode button 302 may be pressed again after the start of the initialization sequence of the back side reading unit 115 (FIG. 7) in step S605 or S609 in FIG. 6. This is a situation where input operation for setting the document reading mode to the one-sided reading mode is performed. In such a case, i.e., when the setting is returned from the two-sided mode to the one-sided mode, the already started initialization sequence of the back side reading unit 115 (FIG. 7) is continued as-is (not stopped). For example, even if the setting is returned from the two-sided mode to the one-sided mode after the start of the initialization sequence of the back side reading unit 115, the CPU 101 of the controller unit 200 does not notify the CPU 12 of the image reading unit 100 of this return. Alternatively, even if the CPU 12 is notified that the setting is returned from the two-sided mode to the one-sided mode after the start of the initialization sequence of the back side reading unit 115, the CPU 12 of the image reading unit 100 continues execution of the already started initialization sequence of the back side reading unit 115.

Stopping the already started initialization sequence of the back side reading unit 115 in the middle of the processing may cause damage to the unit by applying a load to the unit. The above-described configuration can prevent such damage, thereby increasing the life of the unit.

Using the CCD line sensor as an example of the reading sensor according to an exemplary embodiment of the present invention has been described above. However, the present invention is not limited to this example, and other type of sensor such as a contact image sensor (CIS) may be used for one or both of a front side reading sensor and a back side reading sensor. As also discussed in Japanese Patent Application Laid-Open No. 2008-22527, a CIS is expected to require a longer time for initial setting work due to the structure thereof, as compared with a CCD sensor. For this reason, greater effects are expected to be produced when the present invention is applied to the case where the CIS is used as the back side reading sensor.

The present invention has been described above in detail using some suitable exemplary embodiments, but the present invention is not limited to those specific exemplary embodiments. Various forms in the scope not deviating from the gist of the invention are also included.

Other Exemplary Embodiments

In the exemplary embodiment described above, the example in which the moving glass 22 is moved is described. However, the present invention is not limited to this example. For example, the back side reading unit 115 may be moved. When the back side reading unit 115 is moved, the glass is fixed at the position illustrated in FIG. 2B. In this case, after the power of the controller unit 200 is turned on, the CPU 12 causes the back side reading unit 115 to wait at a position where the reference white board 61 is readable, until the two-sided mode is set. In other words, the back side reading unit 115 is caused to wait so that the reference white board 61 faces the back side CCD line sensor 20. Then, when the two-sided mode is selected by the user, the CPU 12 moves the back side reading unit 115 to the position illustrated in FIG. 2B, after executing the processes in step S703 to step S706 illustrated in FIG. 7. In other words, the back side reading unit 115 is moved to a position where a document is readable. Afterward, when the start key 304 is pressed by the user, the CPU 12 starts a reading job, in response to an instruction from the CPU 101. By executing the reading job, the CPU 12 conveys the documents set on the document tray 1 one by one, and causes the front side CCD line sensor 58 and the back side CCD line sensor 20 to read each of the documents. The CPU 12 then repeats this operation until no documents are left on the document tray 1. Except for the processes described here, processes similar to those described above in the exemplary embodiment may be performed.

An exemplary embodiment of the present invention can also be implemented by such processing that a program that implements one or more functions of each of the above-described exemplary embodiments is supplied to a system or apparatus via a network or storage medium. One or more processors in a computer of the system or apparatus read the program and execute the read program. An exemplary embodiment of the present invention can also be implemented by a circuit (e.g., an application-specific integrated circuit (ASIC)) that implements one or more functions.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-156719, filed Aug. 7, 2015, which is hereby incorporated by reference herein in its entirety.

What is claimed is:

1. An image reading apparatus comprising:
   a document feeder configured to convey a document along a conveyance path and pass the document through a plurality of reading positions;
   a first reader, including a first imaging sensor and a first light source, configured to read a first surface of the document as the document is conveyed by the document feeder through a first reading position;
   a second reader, including a second imaging sensor and a second light source, configured to read a second surface of the document as the document is conveyed by the document feeder through a second reading position;
   an operation display including a user interface function to allow setting of a two-sided reading mode for reading the first surface and the second surface of the document or a one-sided reading mode for reading the first surface of the document; and
   a controller configured to, on a basis of a user instruction received via the operation display, prior to a document reading start instruction, start an initial adjustment operation of the second reader;
   wherein, after the setting of the two-sided reading mode, the controller accepts a user instruction for setting the one-sided reading mode via the operation display during the initial adjustment operation, and
   wherein, even in a case where the user instruction for setting the one-sided reading mode is received during execution of the initial adjustment operation, the execution of the initial adjustment operation continues.

2. The image reading apparatus according to claim 1, wherein the initial adjustment operation includes movement of a reference white board to be used for the initial adjustment operation of the second reader.

3. The image reading apparatus according to claim 1, wherein, in a case where an operation for inputting a document reading start instruction is not performed for a predetermined time or longer after the start of the initial adjustment operation of the second reader, an initialization flag is reset and an adjustment value generated by the initial adjustment operation is not used.

4. The image reading apparatus according to claim 1, wherein a contact image sensor (CIS) is used as the second imaging sensor in the second reader.

5. The image reading apparatus according to claim 1, wherein the initial adjustment operation includes one type or a plurality of types of shading correction, offset adjustment, reading gain adjustment, and light amount adjustment.

6. An image reading apparatus comprising:
   a document feeder configured to convey a document along a conveyance path and pass the document through a plurality of reading positions;
   a first reader, including a first imaging sensor and a first light source, configured to read a first surface of the document as the document is conveyed by the document feeder through a first reading position;
   a second reader, including a second imaging sensor and a second light source, configured to read a second surface of the document as the document is conveyed by the document feeder through a second reading position;
   an operation display including a user interface function to allow setting of a two-sided reading mode for reading the first surface and the second surface of the document or a one-sided reading mode for reading the first surface of the document;
   a moving glass member on which a reference white board to be used for an initial adjustment operation of the second reader is disposed;
   a glass moving motor configured to move the moving glass member; and
   a controller configured to, in accordance with a user instruction for setting the two-sided reading mode via the operation display, prior to a document reading start instruction, cause the glass moving motor to start moving the moving glass member, and start the initial adjustment operation of the second reader,
   wherein the controller accepts a user instruction for setting the one-sided reading mode via the operation display during the initial adjustment operation, and
   wherein, even in a case where the user instruction for setting the one-sided reading mode is received during execution of the initial adjustment operation, the execution of the initial adjustment operation continues.

7. The image reading apparatus according to claim 3, wherein the initial adjustment operation of the second reader starts after the moving glass member is moved by the glass moving motor to place the reference white board at a first predetermined position relative to the second reader.

8. The image reading apparatus according to claim 6, wherein,
   in accordance with the user instruction for setting the two-sided reading mode via the operation display, the moving motor causes the moving glass member to move to a first predetermined position,
   the initial adjustment operation of the second reader is started after the moving glass member is moved to the first predetermined position,
   and after completion of the initial adjustment operation of the second reader, the moving glass member is moved to a second predetermined position relative to the second reader.

9. The image reading apparatus according to claim 8, wherein the moving glass member is located in the second predetermined position during conveyance of the document by the document feeder.

10. A control method for an image reading apparatus including a document feeder configured to convey a document, a first reader configured to read a first surface of the document conveyed by the document feeder, and a second reader configured to read a second surface of the document conveyed by the document feeder, the control method comprising:
    setting a two-sided reading mode for reading the first surface and the second surface of the document prior to a document reading start instruction;
    starting an initial adjustment operation of the second reader in accordance with the setting of the two-sided reading mode; and
    setting a one-sided reading mode for reading the first surface of the document after starting the initial adjustment operation;

wherein, even in a case where the one-sided reading mode is set after the start of the initial adjustment operation, the execution of the initial adjustment operation continues.

11. A control method for an image reading apparatus including a document feeder configured to convey a document, a first reader configured to read a first surface of the document conveyed by the document feeder, a second reader configured to read a second surface of the document conveyed by the document feeder, a reference white board, and a glass moving motor configured to move the reference white board, the control method comprising:
   setting a two-sided reading mode for reading the first surface and the second surface of the document prior to a document reading start instruction;
   moving the reference white board;
   starting the movement of the reference white board, and starting an initial adjustment operation of the second reader, in accordance with the setting of the two-sided reading mode; and
   setting a one-sided reading mode after starting the initial adjustment operation;
   wherein, even in a case where the one-sided reading mode is set after the start of the initial adjustment operation, the execution of the initial adjustment operation continues.

12. A non-transitory computer-readable storage medium storing computer executable instructions for causing a computer to execute a control method of an image reading apparatus including a document feeder configured to convey a document, a first reader configured to read a first surface of the document conveyed by the document feeder, and a second reader configured to read a second surface of the document conveyed by the document feeder, the method comprising:
   setting a two-sided reading mode for reading the first surface and the second surface of the document;
   starting an initial adjustment operation of the second reader in accordance with receiving a notice of the two-sided reading mode; and
   after starting the initial adjustment operation, setting a one-sided reading mode,
   wherein, even in a case where the one-sided reading mode is set after the start of the initial adjustment operation, the execution of the initial adjustment operation continues.

13. A non-transitory computer-readable storage medium storing computer executable instructions for causing a computer to execute a control method of an image reading apparatus including a document feeder configured to convey a document, a first reader configured to read a first surface of the document conveyed by the document feeder, a second reader configured to read a second surface of the document conveyed by the document feeder, a reference white board, and a glass moving motor configured to move the reference white board, the method comprising:
   receiving notice of a two-sided reading mode prior to a document reading start instruction;
   setting a two-sided reading mode for reading the first surface and the second surface of the document, in accordance with receiving the notice of the two-sided reading mode;
   moving the reference white board;
   starting movement of the reference white board, and starting an initial adjustment operation of the second reader, in accordance with the setting of the two-sided reading mode; and
   after starting the initial adjustment operation, setting a one-sided reading mode,
   wherein, even in a case where the one-sided reading mode is set after the start of the initial adjustment operation, the execution of the initial adjustment operation continues.

* * * * *